US007943227B2

(12) United States Patent
Connelly

(10) Patent No.: US 7,943,227 B2
(45) Date of Patent: May 17, 2011

(54) CERAMIC HEAT SHIELD

(75) Inventor: Thomas J. Connelly, Bellevue, WA (US)

(73) Assignee: The Boeing Company, Chicago, IL (US)

(*) Notice: Subject to any disclaimer, the term of this patent is extended or adjusted under 35 U.S.C. 154(b) by 814 days.

(21) Appl. No.: 11/870,513

(22) Filed: Oct. 11, 2007

(65) Prior Publication Data

US 2009/0095443 A1 Apr. 16, 2009

(51) Int. Cl.

| | |
|---|---|
| ***B23B 3/00*** | (2006.01) |
| ***B23B 23/02*** | (2006.01) |
| ***B64C 1/10*** | (2006.01) |
| ***B64D 7/00*** | (2006.01) |
| ***B64G 1/52*** | (2006.01) |

(52) U.S. Cl. ........ 428/166; 428/156; 428/172; 428/192; 428/99; 244/121; 244/171.7; 244/171.8; 89/36.01; 89/36.11

(58) Field of Classification Search .................. 428/156, 428/166, 167, 172, 192, 99, 157; 244/121, 244/133, 171.8, 171.7; 89/36.01, 36.02, 36.11; 109/78–85; 114/14; 228/59; 343/872
See application file for complete search history.

(56) References Cited

U.S. PATENT DOCUMENTS

| | | | | |
|---|---|---|---|---|
| 5,976,997 | A | 11/1999 | Meaney et al. | |
| 6,025,048 | A | 2/2000 | Cutler et al. | |
| 6,562,436 | B2 | 5/2003 | George et al. | |
| 6,623,595 | B1 * | 9/2003 | Han et al. | 156/345.1 |
| 6,689,488 | B2 | 2/2004 | Yoshitome et al. | |
| 6,709,538 | B2 | 3/2004 | George et al. | |
| 2006/0188696 | A1 | 8/2006 | Grose et al. | |
| 2006/0234579 | A1 * | 10/2006 | Adam et al. | 442/136 |

FOREIGN PATENT DOCUMENTS

WO PCT/US2008/076253 9/2008

* cited by examiner

*Primary Examiner* — David R Sample
*Assistant Examiner* — Catherine Simone
(74) *Attorney, Agent, or Firm* — Tung & Associates

(57) ABSTRACT

A heat shield includes a ceramic composite heat shield panel having a generally concave first surface and a generally convex second surface and a pair of thickened panel edge portions provided in the heat shield panel. A heat shield assembly is also disclosed.

19 Claims, 4 Drawing Sheets

CERAMIC HEAT SHIELD

TECHNICAL FIELD

The disclosure relates generally to heat shields. More particularly, the disclosure relates to a ceramic heat shield which is suitable for aircraft.

BACKGROUND

Existing aircraft heat shields may be made from titanium, which has an upper temperature limit of about 1100 degrees F. Multiple segments may be built into the titanium heat shield to facilitate thermal expansion and contraction. Aircraft engines may be designed to operate more efficiently by running at idle exhaust temperatures which are higher than the heat capacity of titanium. Therefore, in order to maintain the idle exhaust temperature at a temperature level which is lower than the heat capacity of titanium, the engine may require operation at a higher thrust with a resulting higher fuel consumption level. This may result in an increased level of brake wear.

Therefore, a heat shield is needed which can withstand temperatures which are higher than the heat capacity of titanium.

SUMMARY

The disclosure is generally directed to a heat shield. An illustrative embodiment of the heat shield includes a ceramic composite heat shield panel having a generally concave first surface and a generally convex second surface and a pair of thickened panel edge portions provided in the heat shield panel.

The disclosure is further generally directed to a heat shield assembly. An illustrative embodiment of the heat shield assembly includes a heat shield comprising a ceramic composite heat shield panel having a generally concave first surface and a generally convex second surface and a pair of thickened panel edge portions provided in the heat shield panel of the heat shield. A pair of side skins extends from the pair of thickened panel edge portions, respectively.

BRIEF DESCRIPTION OF THE ILLUSTRATIONS

DETAILED DESCRIPTION

Figure 1:
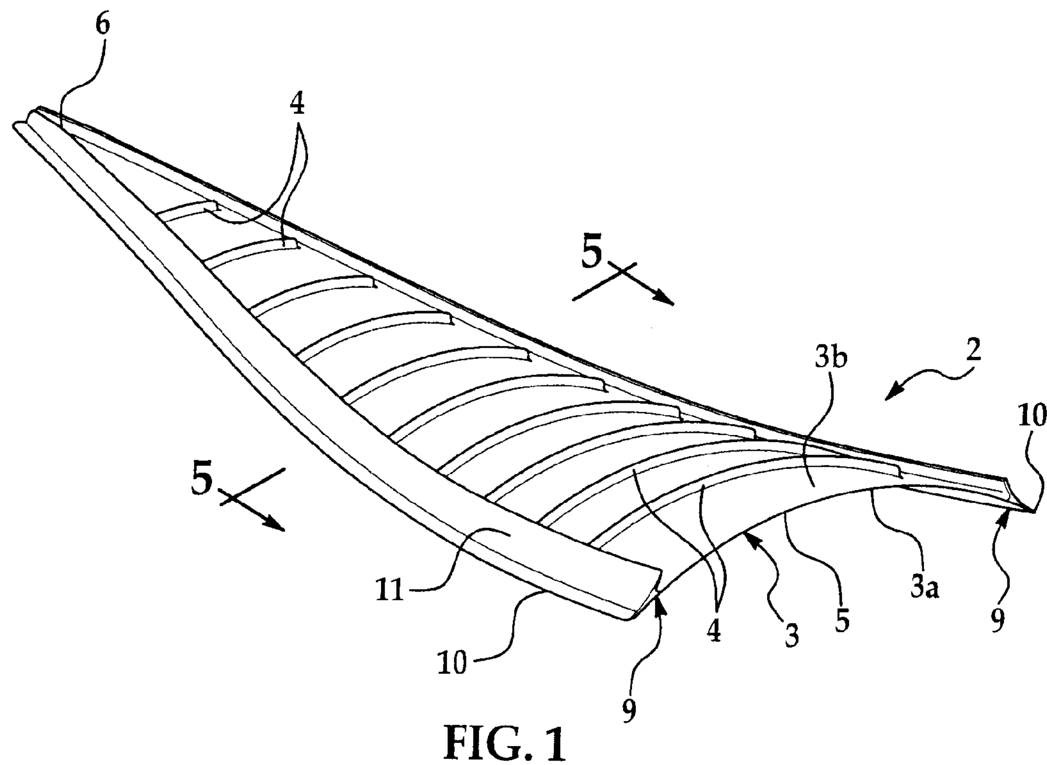
FIG. 1 is a perspective view of an illustrative embodiment of the heat shield.

The disclosure is generally directed to a composite matrix ceramic (CMC) heat shield lower surface which may have a heat capacity higher than that of titanium. The ceramic heat shield may provide a one-piece (no segmented gaps) construction which may undergo minimal thermal expansion during aircraft engine thermal cycling and may have a high temperature capacity to thermally isolate structure and systems above the heat shield from engine exhaust on an aircraft. Consequently, an aircraft engine on which the heat shield is assembled may be operated at a lower idle thrust and higher temperature, resulting in decreased fuel consumption and brake wear.

Referring initially to FIGS. 1 and 5-7, an illustrative embodiment of the heat shield is generally indicated by reference numeral 2. The heat shield 2 may include a heat shield panel 3 which may include a wide panel end 5 and a narrow panel end 6 and have a generally elongated, conical shape when viewed from above or below. The heat shield panel 3 may have a generally concave lower surface 3*a* and a generally convex upper surface 3*b*. Multiple stiffening ribs 4 may be shaped in the heat shield panel 3 in generally spaced-apart, parallel relationship with respect to each other for structural reinforcing purposes.

Figure 5:
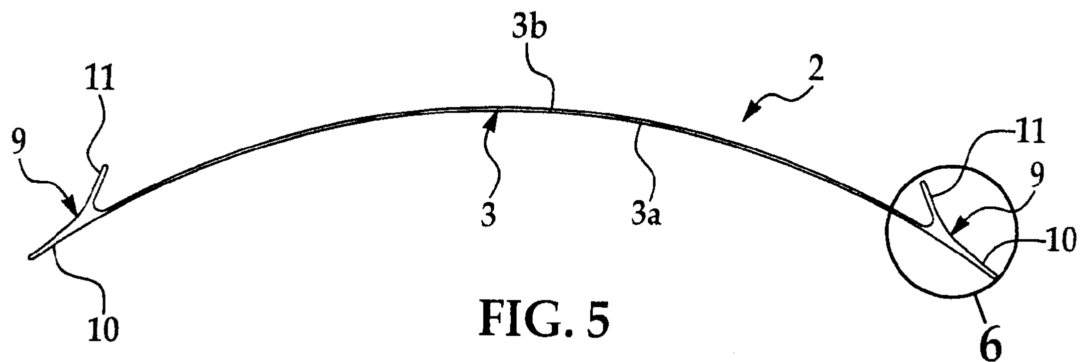
FIG. 5 is a transverse sectional view, taken along section lines 5-5 in FIG. 1, of an illustrative embodiment of the heat shield.
Figure 6:
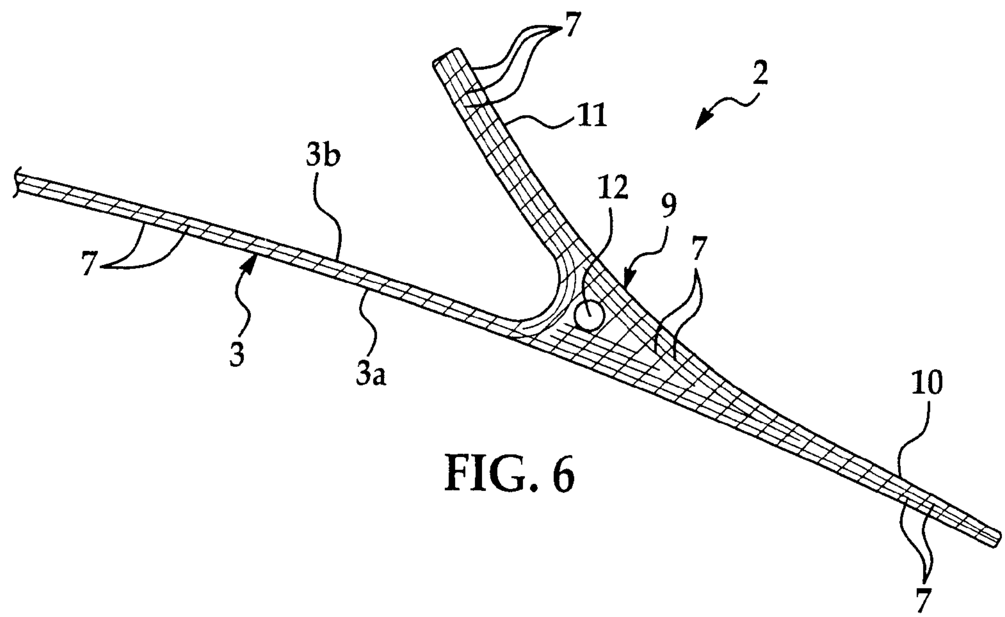
FIG. 6 is an enlarged sectional view, taken along section line 6 in FIG. 5, of an illustrative embodiment of the heat shield.

As shown in FIGS. 5 and 6, thickened panel edge portions 9 may be provided in the opposite longitudinal edges of the heat shield panel 3. A panel side flange 10 may extend outwardly from each panel edge portion 9. A side skin attachment flange 11 may extend from each panel edge portion 9 at a generally acute angle with respect to the heat shield panel 3. Therefore, each panel edge portion 9 may define the junction between the heat shield panel 3; each side flange 10; and the corresponding side skin attachment flange 11. As shown in FIG. 1, the panel edge portions 9 and side skin attachment flanges 11 may converge and meet at the narrow panel end 6 of the heat shield panel 3.

Figure 7:
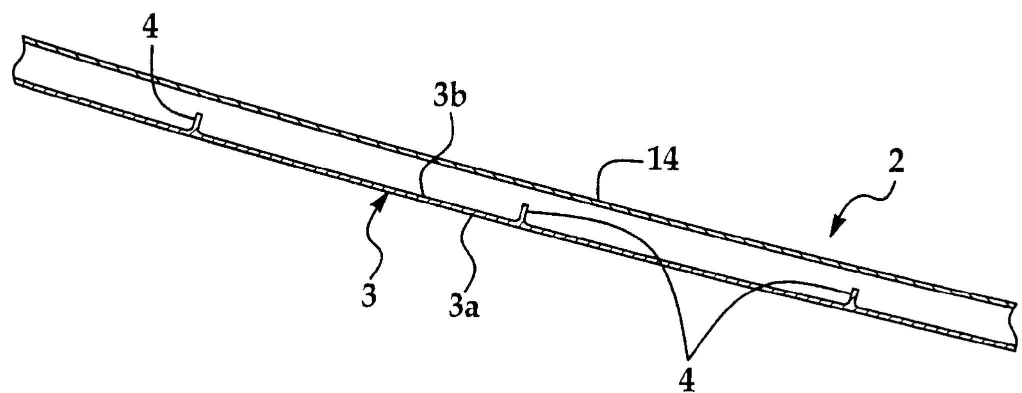
FIG. 7 is a longitudinal sectional view of an alternative illustrative embodiment of the heat shield.

The heat shield panel 3 and each panel edge portion 9, side flange 10 and side skin attachment flange 11 may be a ceramic composite material having a high temperature capacity such as composite matrix ceramic (CMC), for example and without limitation. As shown in FIG. 6, the heat shield panel 3 and each side flange 10 and each side skin attachment flange 11 may include multiple laminated CMC plies 7. A radius filler or "noodle" 12 may fill the interface between the plies 7 at the joint between the heat shield panel 3, each side flange 10 and the corresponding side skin attachment flange 11 in each panel edge portion 9, as is known to those skilled in the art. As shown in FIG. 7, in some embodiments an insulation coating 14 may be provided on the heat shield panel 3 and may additionally be provided on the panel side portions 9, shown in FIG. 6, side flanges 10 and side skin attachment flanges 11 of the heat shield 2.

Figure 2:
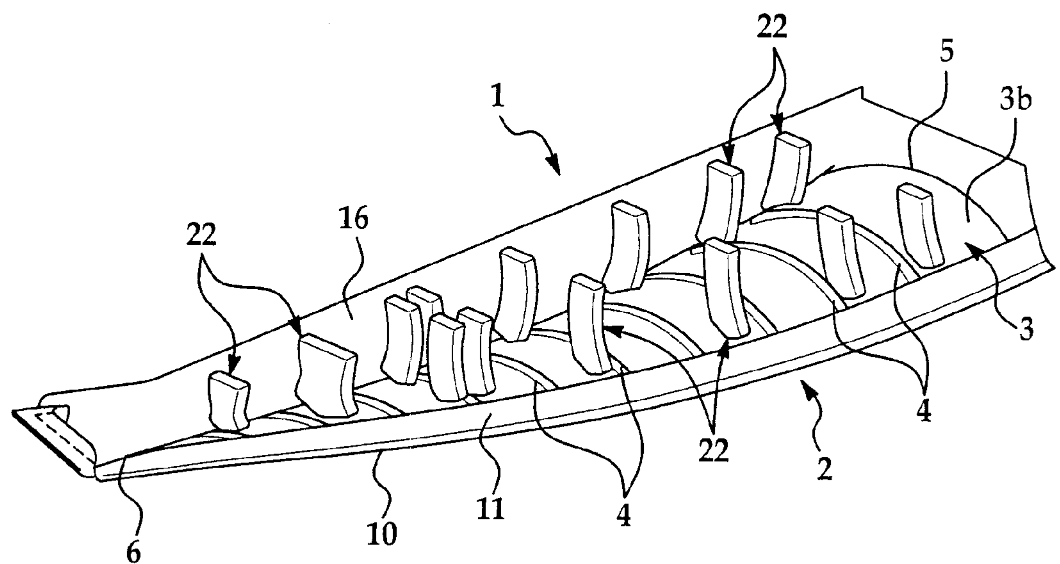
FIG. 2 is a perspective view of a heat shield assembly which includes an illustrative embodiment of the heat shield and side skins (one of which is shown) attached to the heat shield assembly.
Figure 3:
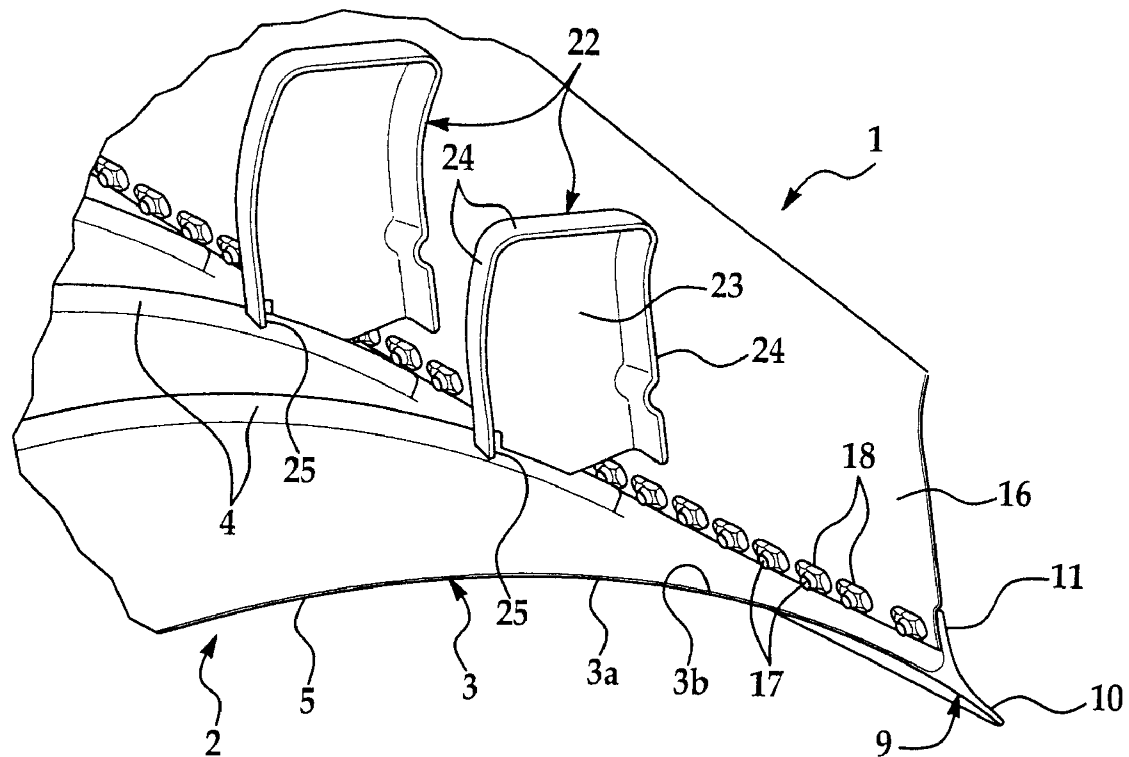
FIG. 3 is an enlarged sectional perspective view, illustrating a pair of nut plates attaching a side skin to an illustrative embodiment of the heat shield in a heat shield assembly.
Figure 4:
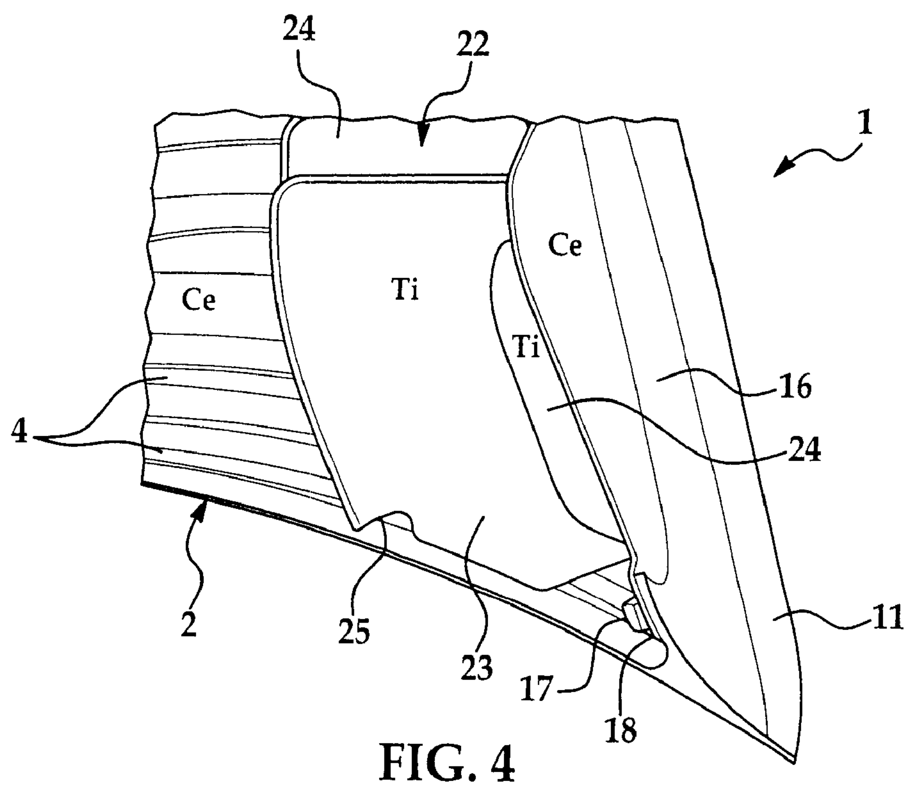
FIG. 4 is a sectional view of an illustrative embodiment of the heat shield, more particularly detailing attachment of each nut plate to a side skin in the heat shield assembly.

Referring next to FIGS. 2-4 of the drawings, the heat shield 2 may be a part of a heat shield assembly 1. In the heat shield assembly 1, a side skin 16 may be attached to each side skin attachment flange 11 of the heat shield 2. Each side skin 16 may be diffusion-bonded SPF (superplastic forming) titanium, for example and without limitation and may be a continuous piece having no split line. Each side skin 16 may be attached to the corresponding side skin attachment flange 11 according to any suitable technique which is known to those skilled in the art. As shown in FIG. 3, in some embodiments multiple side skin fasteners 17 may extend through respective registering pairs of fastener openings (not shown) provided in the side skin attachment flange 11 and the side skin 16, respectively. Securing nuts 18 may be provided on the respective side skin fasteners 17 and threaded against the interior surface of the side skin 16.

As further shown in FIGS. 2-4, in some embodiments a nut plate 22 is attached to each stiffening rib 4 in the heat shield panel 3 and to the side skin 16. Each nut plate 22 may be titanium, for example and without limitation and may include a generally rectangular nut plate panel 23. A reinforcing lip 24 may extend from one or multiple edges of the nut plate panel 23. A rib notch 25 may be provided in the reinforcing lip 24 to receive and engage the stiffening rib 4 in a snap-fit.

In typical application of the heat shield 2, the heat shield panel 3 of the heat shield assembly 1 is attached to an aft pylon fairing (not shown) and wing structure (not shown) on a jet passenger aircraft according to the knowledge of those skilled in the art. In operation of the aircraft, exhaust gases (not shown) from the jet engine contact the generally concave lower surface 3*a* of the heat shield panel 3, which thermally insulates structures and systems (not shown) above the heat shield assembly 1 from the heat. Because the heat shield panel 3 may be capable of withstanding temperatures which are higher than the temperature capacity of titanium, the jet engine may be operated at a lower idle thrust and higher temperature, resulting in decreased fuel consumption and aircraft brake wear. Furthermore, because it may undergo minimal thermal expansion and contraction during thermal cycling of the jet engine, the heat shield 2 may be constructed in one piece as was noted hereinabove. Consequently, the jet engine can be designed with thermal cycles which are not limited by material restrictions.

Figure 8:
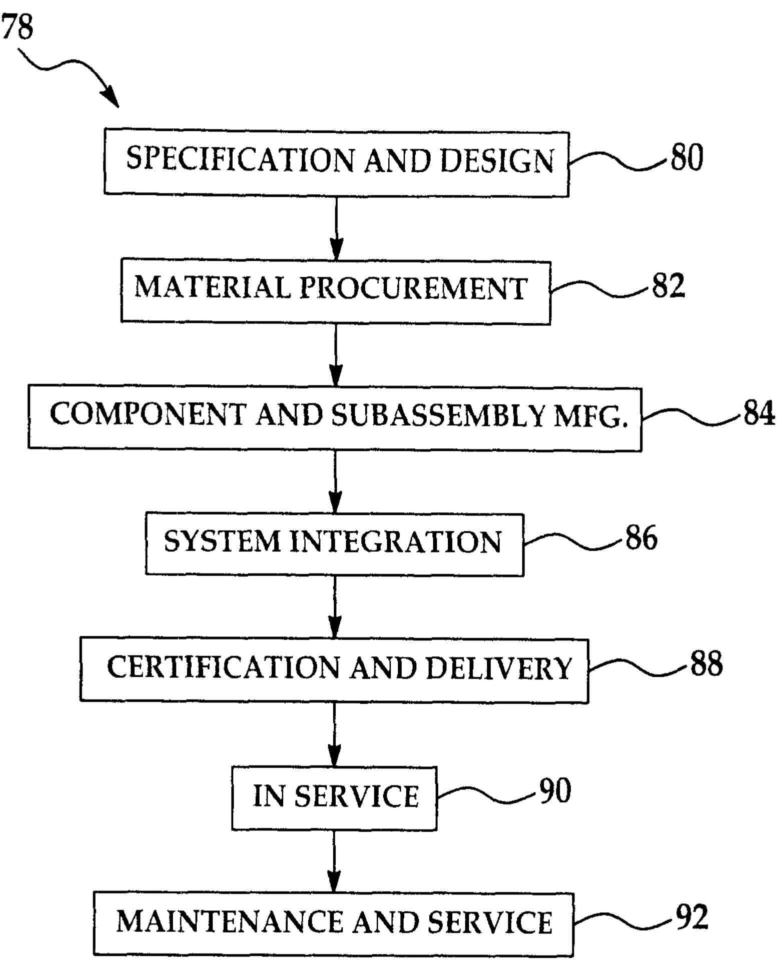
FIG. 8 is a flow diagram of an aircraft production and service methodology.
Figure 9:
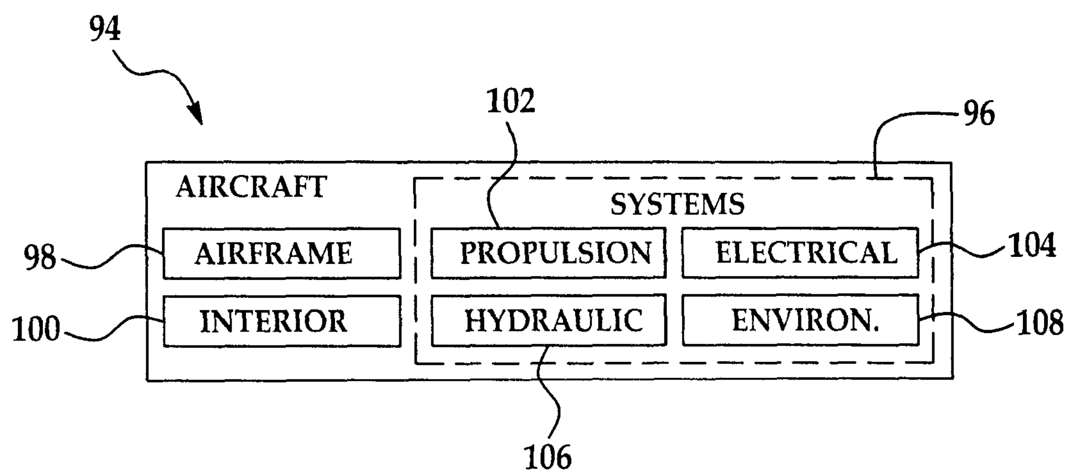
FIG. 9 is a block diagram of an aircraft.

Referring next to FIGS. 8 and 9, embodiments of the disclosure may be used in the context of an aircraft manufacturing and service method 78 as shown in FIG. 8 and an aircraft 94 as shown in FIG. 9. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A heat shield, comprising:

a ceramic composite heat shield panel having a generally concave first surface and a generally convex second surface; and a pair of thickened panel edge portions each provided on one of two spaced-apart opposing edges of said heat shield panel; said heat shield panel and each of said pair of thickened panel edge portions has a laminated multi-ply construction.

2. The heat shield of claim 1 wherein said heat shield panel has a generally elongated, conical shape.

3. The heat shield of claim 1 further comprising a plurality of stiffening ribs provided in said heat shield, panel.

4. The heat shield of claim 1 further comprising a pair of side flanges extending outwardly from said pair of thickened panel edge portions, respectively.

5. The heat shield of claim 1 further comprising a pair of side skin attachment flanges extending from said pair of thickened panel edge portions, respectively.

6. The heat shield of claim 1 wherein said heat shield panel comprises composite matrix ceramic.

7. The heat shield of claim 1 further comprising an insulation coating provided on said heat shield panel.

8. A heat shield assembly, comprising:

a heat shield comprising:

a ceramic composite heat shield panel having a generally concave first surface and a generally convex second surface; and a pair of thickened panel edge portions provided in said heat shield panel of said heat shield; and a pair of side skins extending from said pair of thickened panel edge portions, respectively.

9. The heat shield assembly of claim 8 wherein said heat shield panel has a generally elongated, conical shape.

10. The heat shield of claim 8 further comprising a plurality of stiffening ribs provided in said heat shield panel.

11. The heat shield of claim 8 further comprising a pair of side flanges extending outwardly from said pair of thickened panel edge portions, respectively.

12. The heat shield of claim 8 further comprising a pair of side skin attachment flanges extending from said pair of thickened panel edge portions, respectively, and wherein said pair of side skins is attached to said pair of side skin attachment flanges, respectively.

13. The heat shield of claim 8 wherein said heat shield panel and each of said pair of thickened panel edge portions has a laminated multi-ply construction.

14. The heat shield of claim 8 wherein said heat shield panel comprises composite matrix ceramic.

15. The heat shield of claim 8 further comprising an insulation coating provided on said heat shield panel.

16. A heat shield assembly, comprising:

a heat shield comprising:

a ceramic composite heat shield panel having a generally concave first surface and a generally convex second surface; and a pair of thickened panel edge portions provided in said heat shield panel;

a pair of side skins extending from said pair of thickened panel edge portions, respectively, of said heat shield; and a plurality of nut plates engaging said heat shield panel of said heat shield and each of said pair of side skins.

17. The heat shield assembly of claim 16 wherein said heat shield panel has a generally elongated, conical shape.

18. The heat shield assembly of claim 16 further comprising a plurality of stiffening ribs provided in said heat shield panel of said heat shield and wherein each of said plurality of nut plates engages a corresponding one of said plurality of stiffening ribs.

19. The heat shield assembly of claim 18 further comprising a rib notch provided in each of said plurality of nut plates and wherein said rib notch receives said corresponding one of said plurality of stiffening ribs.

* * * * *